United States Patent
Hussain et al.

(10) Patent No.: US 10,069,423 B2
(45) Date of Patent: *Sep. 4, 2018

(54) PHASE-SHIFTING A SYNCHRONIZATION SIGNAL TO REDUCE ELECTROMAGNETIC INTERFERENCE

(71) Applicant: Apple Inc., Cupertino, CA (US)

(72) Inventors: Asif Hussain, San Jose, CA (US); Nicholas A. Sims, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,333

(22) Filed: Jul. 12, 2016

(65) Prior Publication Data

US 2016/0373013 A1    Dec. 22, 2016

Related U.S. Application Data

(63) Continuation of application No. 13/705,476, filed on Dec. 5, 2012, now Pat. No. 9,419,526.

(60) Provisional application No. 61/612,040, filed on Mar. 16, 2012.

(51) Int. Cl.
| | |
|---|---|
| *H02M 3/335* | (2006.01) |
| *H02M 1/44* | (2007.01) |
| *H02M 3/28* | (2006.01) |
| *H02M 1/00* | (2006.01) |
| *H02M 3/158* | (2006.01) |

(52) U.S. Cl.
CPC ......... *H02M 3/33507* (2013.01); *H02M 1/44* (2013.01); *H02M 3/285* (2013.01); *H02M 3/33561* (2013.01); *H02M 3/1584* (2013.01); *H02M 3/33515* (2013.01); *H02M 2001/007* (2013.01); *H02M 2001/008* (2013.01); *H02M 2001/009* (2013.01)

(58) Field of Classification Search
CPC .. H02M 1/12; H02M 1/44; H02M 2001/0067; H02M 2001/007; H02M 2001/008; H02M 3/33507; H02M 3/33515; H02M 3/33523; H02M 3/33561; H02M 3/33576; H02M 3/285; H02M 2003/1586
See application file for complete search history.

(56) References Cited

U.S. PATENT DOCUMENTS

| | | |
|---|---|---|
| 5,077,486 A | 12/1991 | Marson |
| 9,419,526 B2 * | 8/2016 | Hussain ................. H02M 1/44 |
| 2004/0123167 A1 | 6/2004 | Chapuis |
| 2004/0189271 A1 | 9/2004 | Hansson |

(Continued)

FOREIGN PATENT DOCUMENTS

| | | |
|---|---|---|
| CN | 1684350 A | 10/2005 |
| CN | 1685459 A | 10/2005 |

(Continued)

*Primary Examiner* — Fred E Finch, III
(74) *Attorney, Agent, or Firm* — Blank Rome LLP

(57) ABSTRACT

A power supply with reduced electromagnetic interference (EMI) is described. This power supply includes cascaded stages with switched-mode power-supply circuits that are switched synchronously during operation by switching signals that have a common fundamental frequency. EMI associated with the power supply is reduced by establishing a phase shift between the switching signals in at least two of the stages.

18 Claims, 9 Drawing Sheets

(56) References Cited

U.S. PATENT DOCUMENTS

| | | |
|---|---|---|
| 2005/0225176 A1 | 10/2005 | Gan |
| 2008/0288201 A1 | 11/2008 | Oettinger |
| 2009/0190380 A1 | 7/2009 | Nangreaves |
| 2010/0157631 A1 | 6/2010 | Lim |
| 2011/0103097 A1 | 5/2011 | Wang |
| 2011/0249472 A1 | 10/2011 | Jain |
| 2011/0254379 A1 | 10/2011 | Madawala |
| 2012/0014138 A1 | 1/2012 | Ngo |
| 2013/0083563 A1 | 4/2013 | Wang |
| 2013/0272032 A1 | 10/2013 | Mueller |
| 2013/0308344 A1* | 11/2013 | Rosado ............ H02M 3/33584 363/17 |
| 2014/0203737 A1* | 7/2014 | Prodic ................ B60L 11/1866 318/139 |

FOREIGN PATENT DOCUMENTS

| | | |
|---|---|---|
| CN | 102144352 A | 8/2011 |
| TW | 201128916 A | 8/2011 |

* cited by examiner

PHASE-SHIFTING A SYNCHRONIZATION SIGNAL TO REDUCE ELECTROMAGNETIC INTERFERENCE

CROSS REFERENCE TO RELATED APPLICATION

This application is a continuation of U.S. Non-Provisional Application Ser. No. 13/705,476, entitled "Phase-Shifting a Synchronization Signal to Reduce Electromagnetic Interference," by. Asif Hussain and Nicholas A. Sims, filed on Dec. 5, 2012, which claims priority under 35 U.S.C. § 119(e) to U.S. Provisional Application Ser. No. 61/612,040, entitled "Phase-Shifting a Synchronization Signal to Reduce Electromagnetic Interference," by Asif Hussain and Nicholas A. Sims, filed on Mar. 16, 2012, the contents of both of which are herein incorporated by reference.

BACKGROUND

Field

The described embodiments relate to techniques for controlling electromagnetic interference (EMI) associated with a power supply. More specifically, the described embodiments relate to techniques for reducing EMI by introducing a phase shift between the switching signals used to synchronously drive cascaded stages in a power supply.

Related Art

Switched-mode power supplies (which are sometimes referred to as 'switching regulators') are widely used in electronic devices because they combine high power-conversion efficiency with smaller transformer size and weight. Like other types of power supplies, a switched-mode power supply transfers power from a source (such as an electrical power grid) to a load (such as an electronic device) while converting voltage and current characteristics. Typically, a switched-mode power supply provides a regulated output voltage, which is different than the input voltage.

In a switched-mode power supply, the output current or voltage is regulated by switching a storage element (such as an inductor or a capacitor) between electrical configurations using a switching element, such as a transistor. For example, a pass transistor in a switched-mode power supply may continually switch between low-dissipation, full-on and full-off states, and may spend very little time during the high-dissipation transitions, thereby minimizing the power consumption of the power supply. By varying the ratio of the on-to-off time, the output voltage may be regulated.

However, the switching currents associated with switched-mode power supplies can cause electrical noise. In particular, the switching typically generates high-amplitude, high-frequency energy. While some of this energy can be blocked using a low-pass filter, electromagnetic inference (EMI) can occur. This EMI can complicate the design of electronic devices that include switched-mode power supplies because of its impact on other components in the electronic devices and the increased difficulty in meeting EMI regulatory requirements.

SUMMARY

The described embodiments include a power supply with: a first switched-mode power-supply circuit that outputs a first power signal based on a first switching signal; and a second switched-mode power-supply circuit, electrically coupled to the first switched-mode power-supply circuit, that outputs a second power signal based on a second switching signal, where the first switching signal and the second switching signal have a common fundamental frequency (i.e., the first switched-mode power-supply circuit and the second switched-mode power-supply circuit may be operated synchronously). Moreover, the power supply may include a storage mechanism (such as a programmable register) that stores information specifying a phase value. The power supply may establish a phase shift, corresponding to the phase value, between the first switching signal and the second switching signal based on the stored information. For example, the second switched-mode power-supply circuit may establish the phase shift of the second switching signal relative to the first switching signal. Alternatively or additionally, the first switched-mode power-supply circuit may establish the phase shift of the first switching signal relative to the second switching signal. This phase shift may reduce electromagnetic interference (EMI) associated with the synchronous operation of the first switched-mode power-supply circuit and the second switched-mode power-supply circuit.

In some embodiments, the power supply further includes a feedback mechanism, coupled to the programmable register, which monitors EMI associated with the power supply and adjusts the stored information based on an EMI criterion.

Furthermore, the power supply may include additional stages in series and/or parallel. For example, the power supply may include a third switched-mode power-supply circuit, electrically coupled to the first switched-mode power-supply circuit, that outputs a third power signal based on a third switching signal, where the third switching signal has the fundamental frequency. In this example, the storage mechanism may store additional information specifying another phase value, and the power supply may establish another phase shift, corresponding to the other phase value, between the first switching signal and the third switching signal based on the stored information. Alternatively or additionally, the third switched-mode power-supply circuit may be electrically coupled to the second switched-mode power-supply circuit, and may output the third power signal based on the third switching signal. In this example, the storage mechanism may store the additional information specifying the other phase value, and the power supply may establish the other phase shift, corresponding to the other phase value, between the first switching signal and the third switching signal based on the stored information.

In some embodiments, a programmable delay line (such as a tapped delay line), electrically coupled to the storage mechanism and the second switched-mode power-supply circuit, may establish the phase shift between the first switching signal and the second switching signal based on the stored information.

Note that the first switched-mode power-supply circuit may include a flyback converter, and the second switched-mode power-supply circuit may include a buck converter.

Another embodiment provides an electronic device that includes the power supply.

Another embodiment provides a method for providing a power signal, which may be performed by the power supply. During operation, the power supply outputs an intermediate power signal based on a first switching signal using a first switched-mode power-supply circuit. Then, the power supply modifies a phase of a second switching signal relative to the first switching signal based on stored information specifying a phase value to establish a phase shift, corresponding to the phase value, between the first switching signal and the second switching signal, where the first switching signal and the second switching signal have a common fundamental frequency. Moreover, the power supply provides the power signal based on the second switching signal using a second switched-mode power-supply circuit.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
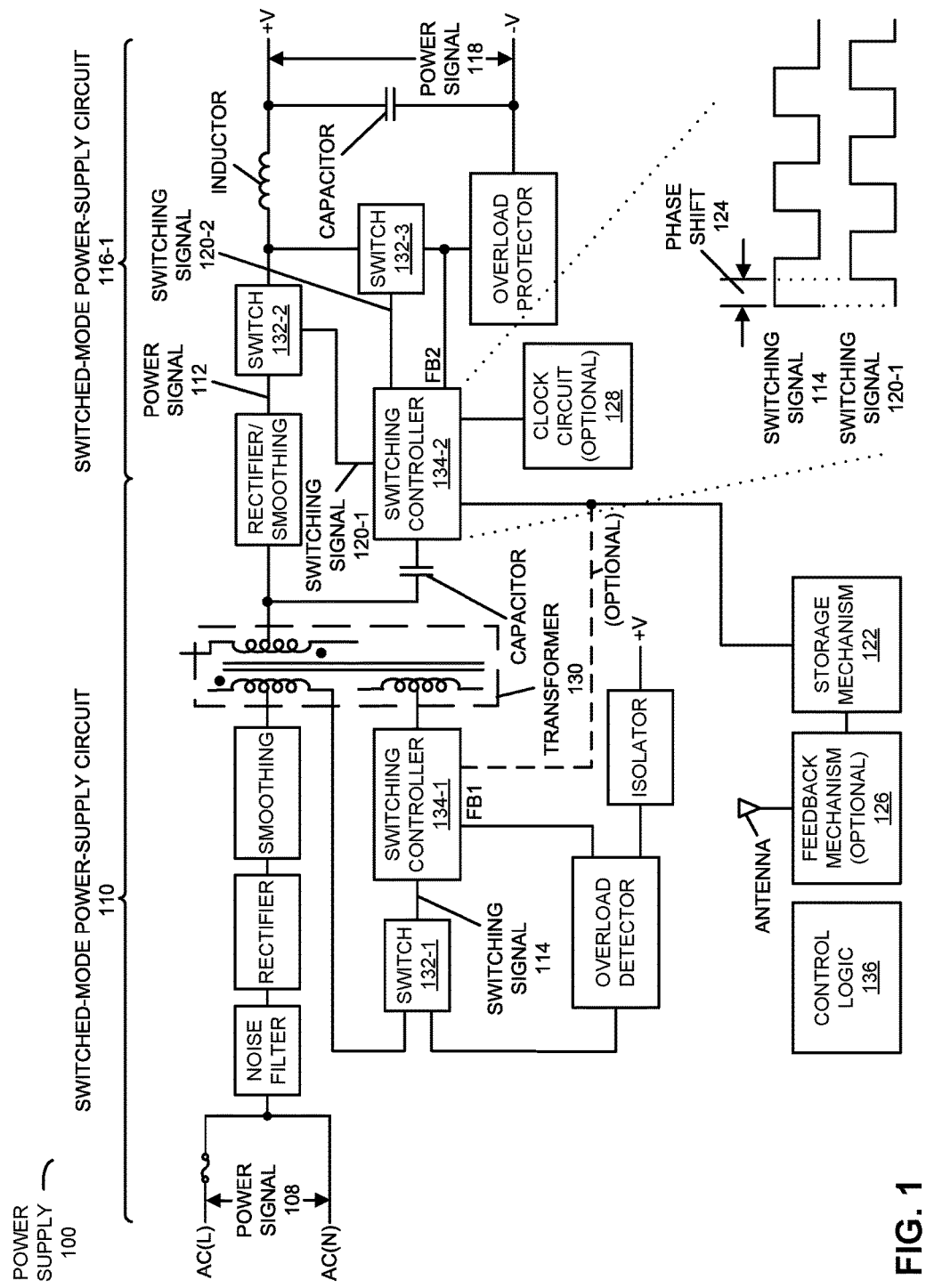
FIG. 1 presents a block diagram illustrating a power supply in accordance with an embodiment of the present disclosure.

FIG. 1 presents a block diagram illustrating a power supply 100 that includes cascaded stages. In particular, power supply 100 includes: a switched-mode power-supply circuit 110 that receives input power signal 108 and outputs a power signal 112 based on a switching signal 114 (which may be provided by an optional clock circuit 128 and/or switching controller 134-1); and a switched-mode power-supply circuit 116-1, electrically coupled to switched-mode power-supply circuit 110, that outputs a power signal 118 based on at least switching signal 120-1 (which may be derived from power signal 112), where switching signal 114 and switching signal 120-1 have a common fundamental frequency, such as 100 kHz (i.e., switched-mode power-supply circuit 110 and switched-mode power-supply circuit 116-1 may be operated synchronously). Synchronous operation of the cascaded stages can ensure that electromagnetic interference (EMI) associated with power supply 100 is predictable. This may allow this electrical noise to be filtered out in electronic devices and systems (such as electronic device 800 in FIG. 8) that include power supply 100.

However, synchronous operation of switched-mode power-supply circuit 110 and switched-mode power-supply circuit 116-1 in power supply 100 can increase the amplitude of the EMI. This can be addressed (i.e., the EMI amplitude or power can be reduced) by introducing a phase shift 124 between switching signal 114 and switching signal 120-1 (which is shown in the inset to FIG. 1). In particular, power supply 100 may include a storage mechanism 122 (such as a programmable register) that stores information specifying a phase value. Power supply 100 may establish phase shift 124, corresponding to the phase value, between switching signal 114 and switching signal 120-1 based on the stored information. For example, as shown in FIG. 1 switched-mode power-supply circuit 116-1 may establish phase shift 124 of switching signal 120-1 relative to switching signal 114. However, in some embodiments switched-mode power-supply circuit 110 establishes phase shift 124 of switching signal 114 relative to switching signal 120-1.

While a variety of power-supply circuits may be used in power supply 100, as illustrated in FIG. 1 switched-mode power-supply circuit 110 may include an isolated flyback converter, and switched-mode power-supply circuit 116-1 may include a non-isolated buck converter. During operation of power supply 100, input power signal 108 from a source (such as a battery or a full-bridge rectifier or a half-bridge rectifier electrically coupled to household alternating current electricity provided by an electrical power grid) is electrically coupled to the primary winding of transformer 130 in switched-mode power-supply circuit 110 in an alternating fashion by switch 132-1 (such as a field-effect transistor or a FET) based on switching signal 114 (for example, using a signal output by switching controller 134-1 in response to switching signal 114). Then, a diode and capacitor, which are in parallel with the secondary winding of transformer 130, store the peak voltage (and, more generally, energy) output by transformer 130 on the capacitor. This voltage, which is associated with power signal 112, is input to switched-mode power-supply circuit 116-1.

Switched-mode power-supply circuit 116-1 is a step-down DC-to-DC converter. Based on switching signals 120 (which, as discussed below, may be output by switching controller 134-2 in response to a voltage on the secondary winding of transformer 130), switches 132-2 and 132-3 (such as FETs) alternately electrically couple the voltage on the capacitor in switched-mode power-supply circuit 110 to the inductor in switched-mode power-supply circuit 116-1 to store energy, and then discharge the inductor into a load (such as a computer system) by outputting power signal 118. In an exemplary embodiment, the voltage associated with power signal 118 is one of: 1 V, 1.8 V, 3.3 V, 5 V, 8 V, and 12 V.

As noted previously, in an exemplary embodiment switching controller 134-2 in switched-mode power-supply circuit 116-1 monitors the voltage on the secondary winding of transformer 130 (prior to the rectifying by the diode) and uses this voltage to determine the one or more synchronous switching signals 120. In particular, the switching time of switched-mode power-supply circuit 110 may be at an edge (such as an edge associated with a square-wave switching signal 114) in the monitored voltage, and switched-mode power-supply circuit 116-1 may establish phase shift 124 relative to this edge using the information stored in storage mechanism 122. Note that in some embodiments switch 132-3 is replaced by a diode and operation of switched-mode power-supply circuit 116-1 is controlled by switching signal 120-1 (i.e., switching signal 120-2 may not be needed).

In some embodiments, power supply 100 further includes an optional feedback mechanism 126, coupled to storage mechanism 122, which monitors EMI associated with power supply 100 and adjusts the stored information based on an EMI criterion (such as at least a 5-15 dBµV reduction in EMI between 150 kHz and 30 MHz). For example, optional feedback mechanism 126 may include an antenna and a receiver that monitor the EMI produced by power supply 100 in one or more frequency bands. Concurrently, control logic 136 outputs a signal (or provides an instruction) that sweeps phase shift 124 over a range of values. (Note that for clarity electrical connections between control logic 136 and other components in power supply 100 are not shown.) Moreover, optional feedback mechanism 126 may implement a phase-value optimization technique that selects or chooses the phase shift 124 (and, thus, the phase value) with the minimum EMI. Then, control logic 136 or optional feedback mechanism 126 may update the stored information in storage mechanism 122.

Thus, the information stored in storage mechanism 122 may be static or dynamic. Furthermore, in some embodiments the phase value may be programmable, i.e., an arbitrary value of phase shift 124 may be stored. Note that the phase value may have a digital representation, and may be restricted to a discrete value or any of a set of discrete values.

A variety of techniques and circuits may be used to establish phase shift 124 of switching signal(s) 120 relative to switching signal 114 based on the stored information. For example, switching signals 114 and 120-1 may be generated using a phase-locked loop (PLL). Therefore, optional clock circuit 128 and/or switched-mode power-supply circuit 116-1 may include the PLL. A PLL is a closed-loop frequency-control system based on the phase difference between an input clock signal and a feedback clock signal of a controlled oscillator (such as a voltage-controlled oscillator or VCO).

Figure 2:
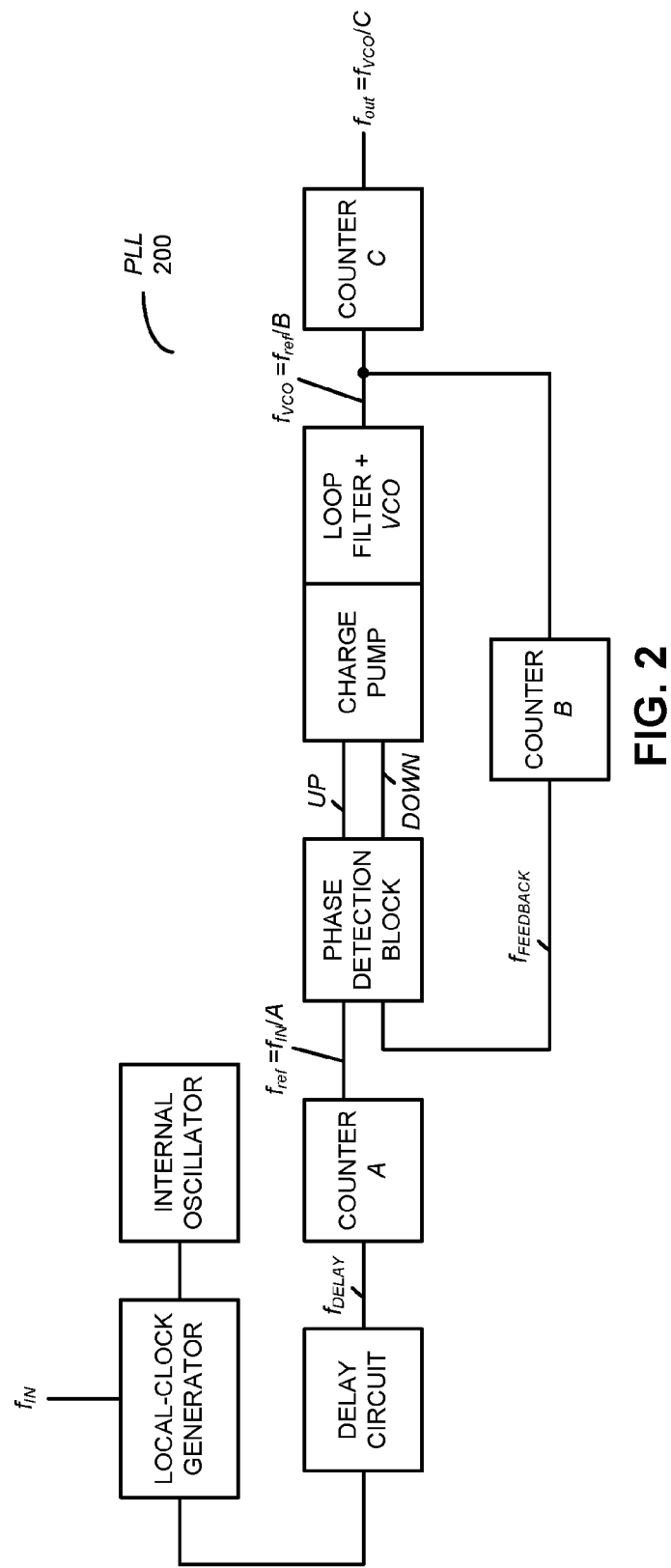
FIG. 2 presents a block diagram illustrating a phase-locked loop (PLL) in the power supply of FIG. 1 in accordance with an embodiment of the present disclosure.
Figure 3:
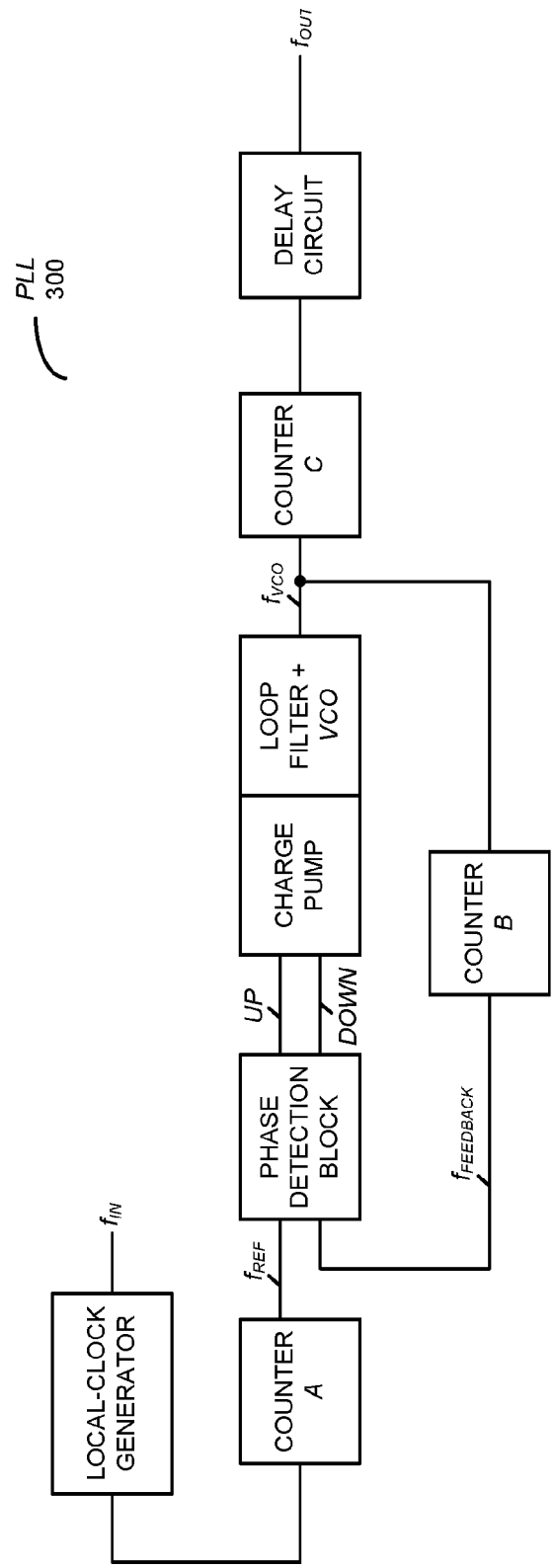
FIG. 3 presents a block diagram illustrating a PLL in the power supply of FIG. 1 in accordance with an embodiment of the present disclosure.

In order to establish phase shift 124, either the input or the output of the PLL may be delayed. The former is illustrated in FIG. 2, which presents a block diagram illustrating a phase-locked loop (PLL) 200; the latter is shown in FIG. 3, which presents a block diagram illustrating a PLL 300. FIG. 2 is used as an illustration. In FIG. 2, note that the local-clock generator may be a programmable-clock generator that runs off of internal oscillator. This local-clock generator may be programmed for the optimal clock frequency. If the external clock ($f_{in}$) is missing, PLL 200 may run off of the local-clock generator. However, PLL 200 may switch back to the external clock when it is available.

Moreover, the main blocks or components of PLL 200 are the phase detector, the charge pump, the loop filter, the VCO and the divider counters (A, B and C). The phase detection block may detect the phase and the frequency between the reference block or component and the feedback clock inputs, and may generate an 'up' or 'down' control signal based on whether the feedback frequency is lagging or leading the reference frequency ($f_{REF}$). This may determine whether the VCO needs to operate at a higher or a lower frequency. These 'up' or 'down' outputs are then fed into the charge pump. If the charge pump receives an 'up' signal, current may be driven into the loop filter. Alternatively, if the charge pump receives a 'down' signal, current may be drawn from the loop filter.

The loop filter may convert these signals into a control voltage which is used to bias the VCO. Based on this control voltage, the VCO may oscillate at a higher or a lower frequency. The VCO may stabilize once the reference clock and the feedback clock have the same phase and frequency.

Moreover, the divider counter (B) may be inserted into the feedback loop to increase the VCO frequency above the input reference frequency. Note that the VCO frequency may be equal to a count of counter B times $f_{REF}$. Furthermore, the phase detection block or component input reference clock may be equal to $f_{REF}$ divided by a count of counter A, and the output frequency $f_{OUT}$ may be equal to the frequency of the VCO ($f_{VCO}$) divided by a count of counter C.

As shown in FIGS. 2 and 3, respectively, for purposes of the synchronization delay, a delay circuit can be added either before counter A or after counter C, i.e., the delay circuit may be introduced at the input clock or at the output clock. Note that delaying the output of the PLL (as shown in FIG. 3) may reduce or eliminate disturbances in the output associated with phase shift 124 (FIG. 1).

Figure 4:
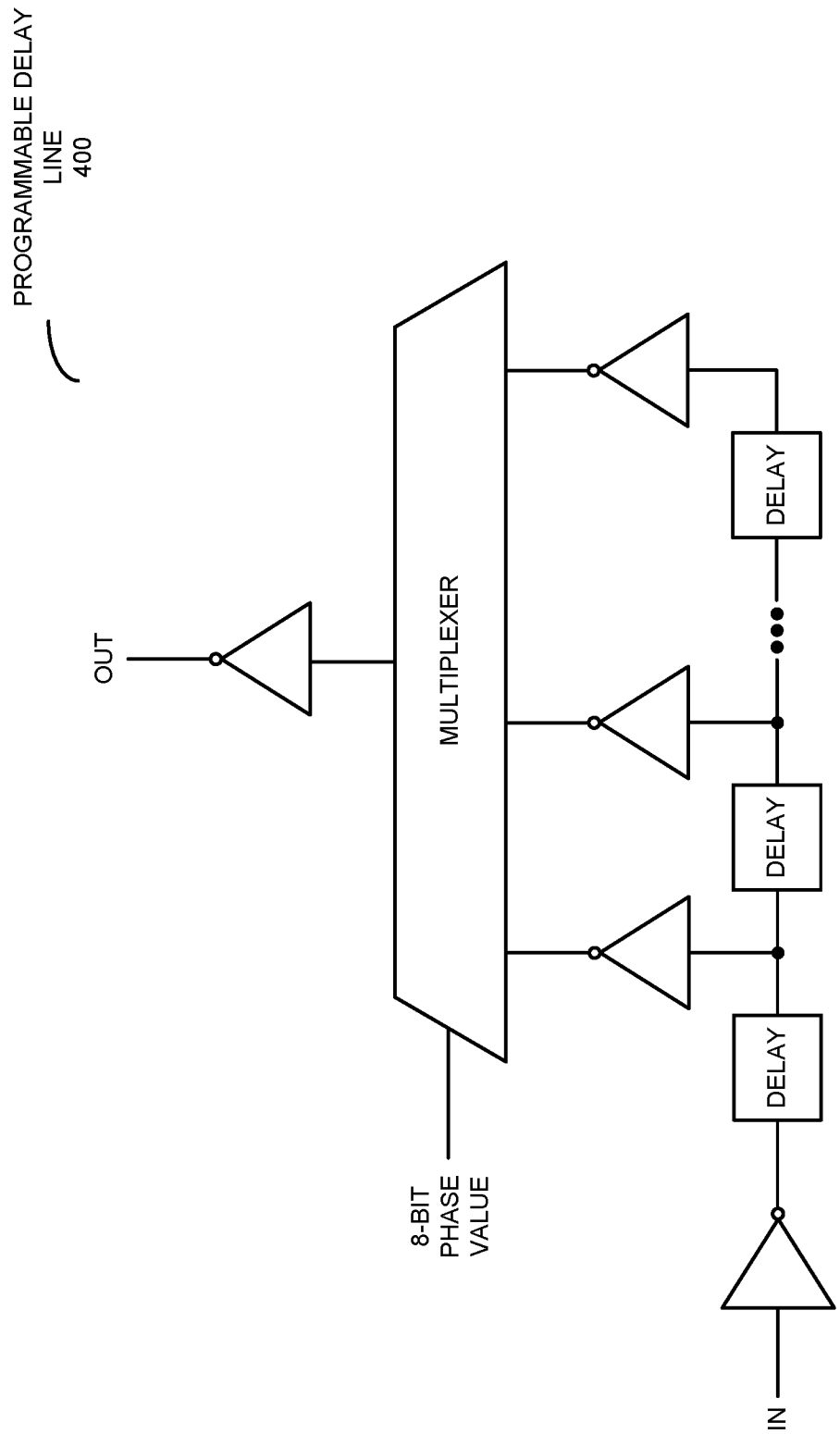
FIG. 4 presents a block diagram illustrating a tapped delay line in the PLL of FIG. 2 or 3 in accordance with an embodiment of the present disclosure.
Figure 5:
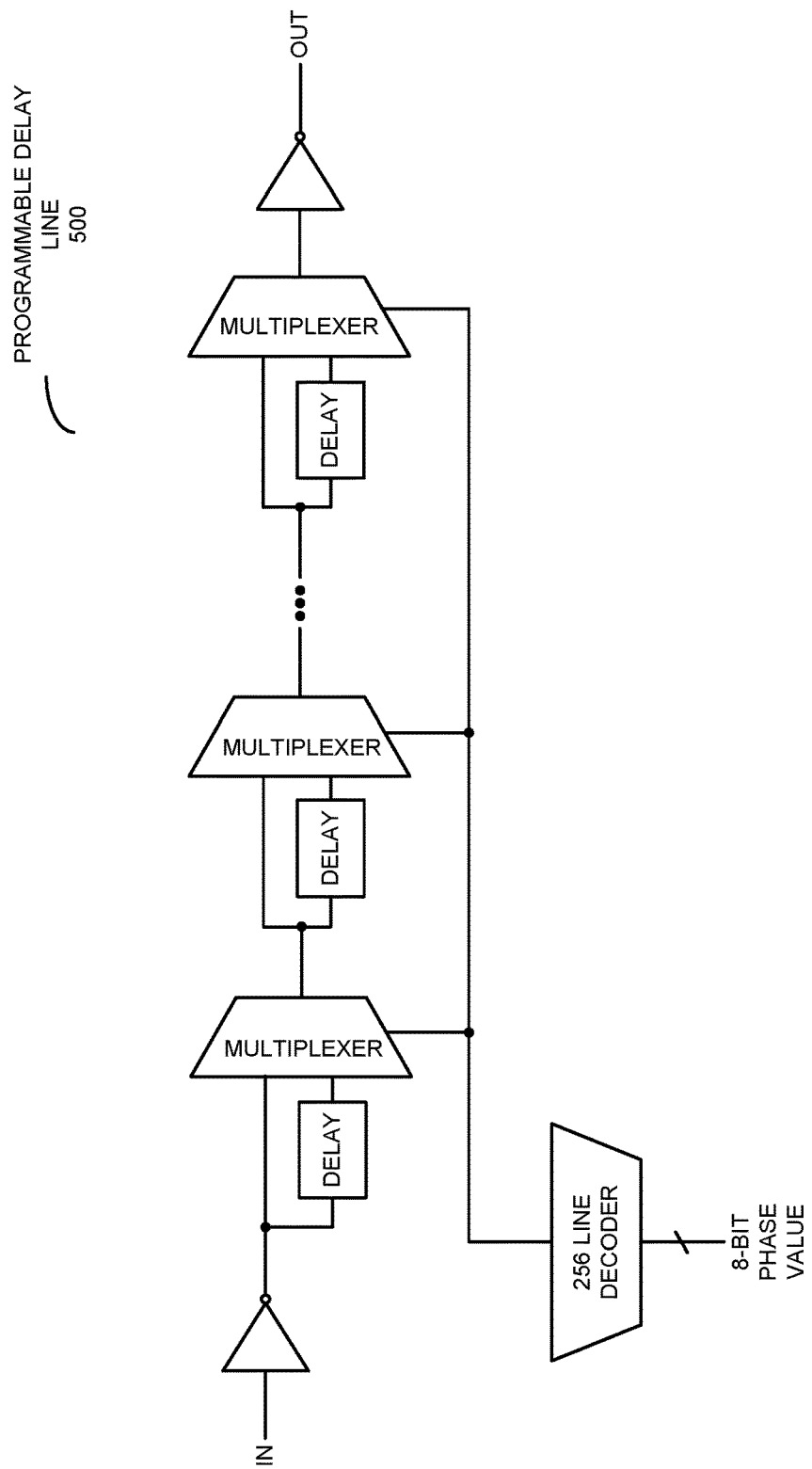
FIG. 5 presents a block diagram illustrating a tapped delay line in the PLL of FIG. 2 or 3 in accordance with an embodiment of the present disclosure.

A variety of techniques and circuits may be used to implement the delay circuit in FIGS. 2 and 3. For example, a programmable delay line may be used. Embodiments of a programmable delay line are shown in FIGS. 4 and 5, which present block diagrams illustrating programmable delay line 400 and programmable delay line 500. The programmable delay line may be electrically coupled to storage mechanism 122 (FIG. 1) and switched-mode power-supply circuit 116-1 (FIG. 1) or switched-mode power-supply circuit 110 (FIG. 1). As illustrated in FIG. 4, the storage mechanism may include an 8-bit register and the multiplexer may use the stored information (such as a digital value) to select an appropriate number of fixed discrete gate delays for phase shift 124 (FIG. 1). Note that the fixed gate delays can be selected based on the clock frequency so that up to 256 delays can be inserted within one clock period of a switching signal in the power supply. Alternatively, as shown in FIG. 5, the storage mechanism may include an 8-bit register and programmable delay line 500 may decode the stored information (such as the digital value) to 256 selectable gate delays using a line decoder.

Referring back to FIG. 1, in an exemplary embodiment control logic 136 provides a signal (or an instruction) to switched-mode power-supply circuit 110 and/or switched-mode power-supply circuit 116-1 that enables or allows phase shift 124 to be established during an EMI-reduction mode. For example, control logic 136 may enable or allow phase shift 124 to be established during EMI regulatory-compliance testing. Subsequently, control logic 136 may disable phase shift 124 (i.e., phase shift 124 may be zero) during normal operation of power supply 100.

Figure 6:
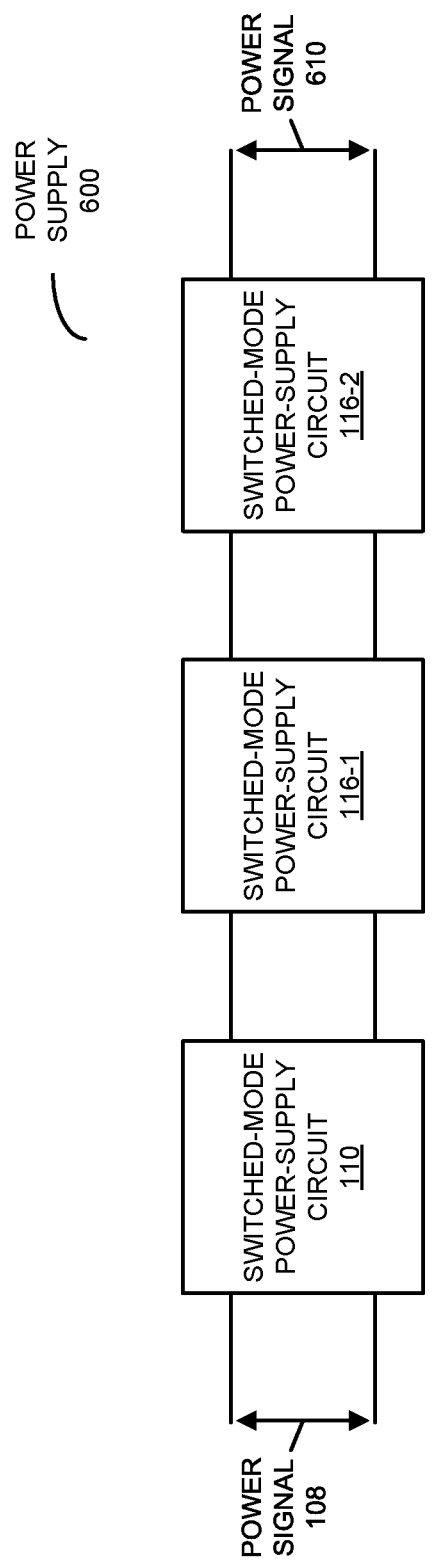
FIG. 6 presents a block diagram illustrating a power supply in accordance with an embodiment of the present disclosure.

The power supply may include additional stages in series and/or parallel. For example, as shown in FIG. 6, which presents a block diagram illustrating power supply 600, switched-mode power-supply circuit 116-2 is electrically coupled to switched-mode power-supply circuit 110. This additional switched-mode power-supply circuit outputs power signal 610 based on a switching signal (such as an instance of switching signals 120 in FIG. 1), which has the fundamental frequency. In this example, storage mechanism 122 may store additional information specifying another phase value; and power supply 600 may establish a phase shift, corresponding to the other phase value, between switching signal 114 and the switching signal in switched-mode power-supply circuit 116-2 based on the stored information.

Figure 7:
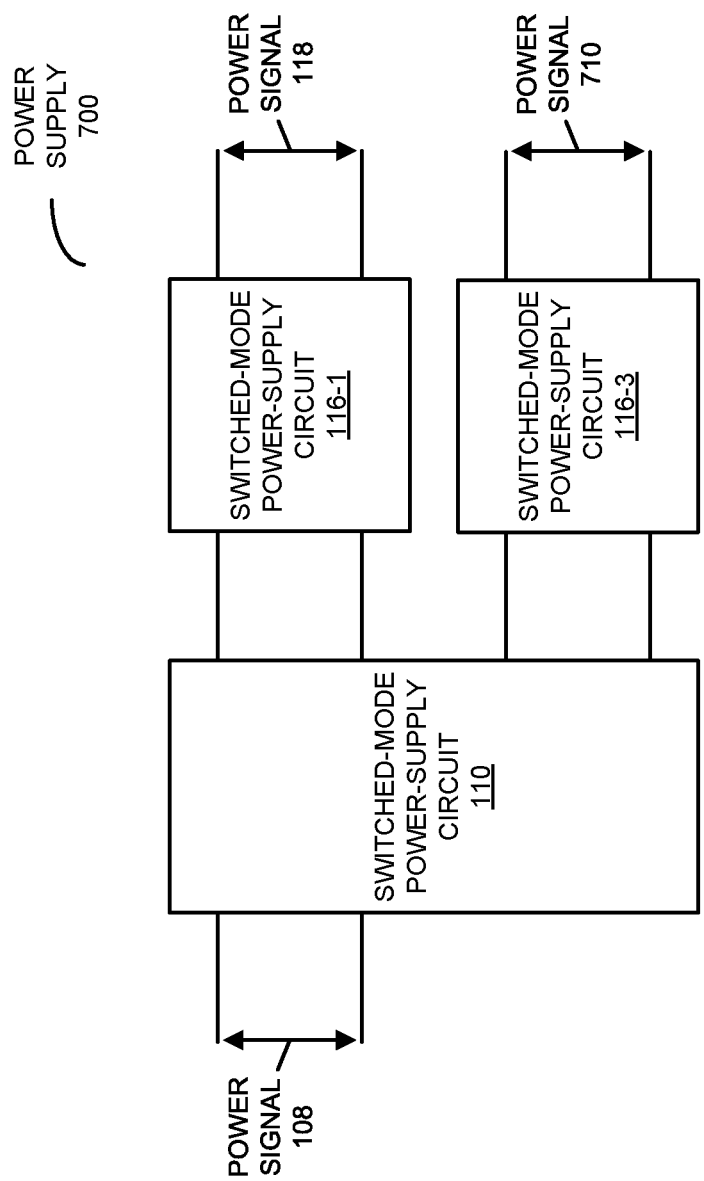
FIG. 7 presents a block diagram illustrating a power supply in accordance with an embodiment of the present disclosure.

Alternatively or additionally, as shown in FIG. 7, which presents a block diagram illustrating power supply 700, switched-mode power-supply circuit 116-3 may be electrically coupled to switched-mode power-supply circuit 116-1, and may output power signal 710 based on a switching signal (such as an instance of switching signals 120 in FIG. 1), which has the fundamental frequency. In this example, storage mechanism 122 may store the additional information specifying another phase value, and power supply 700 may establish a phase shift, corresponding to the other phase value, between switching signal 114 and the switching signal in switched-mode power-supply circuit 116-3 based on the stored information.

Note that, in general, phase shift 124 (FIG. 1), the phase shift in switched-mode power-supply circuit 116-2 and the phase shift in switched-mode power-supply circuit 116-3 may be different than each other, i.e., each of the stages in the embodiments of the power supply (except one, such as switched-mode power-supply circuit 110) may have their own associated phase shift. In some embodiments, the phase shift between two cascaded stages is 90°, 180° or 270°.

Figure 8:
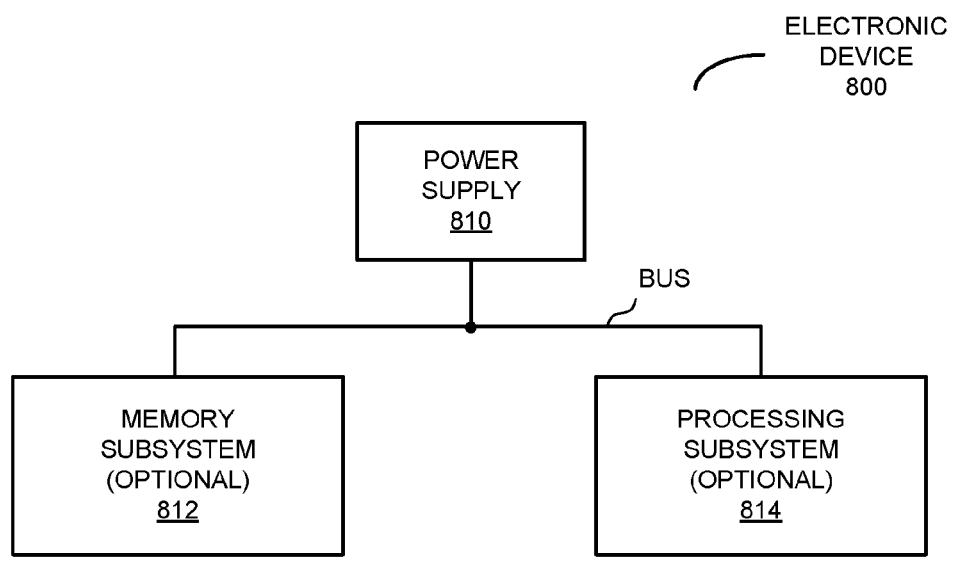
FIG. 8 presents a block diagram illustrating an electronic device that includes the power supply of FIG. 1, 6 or 7 in accordance with an embodiment of the present disclosure.

An embodiment of the power supply may be used in an electronic device. This is shown in FIG. 8, which presents a block diagram illustrating an electronic device 800 that includes an embodiment of the power supply, such as power supply 810.

Figure 9:
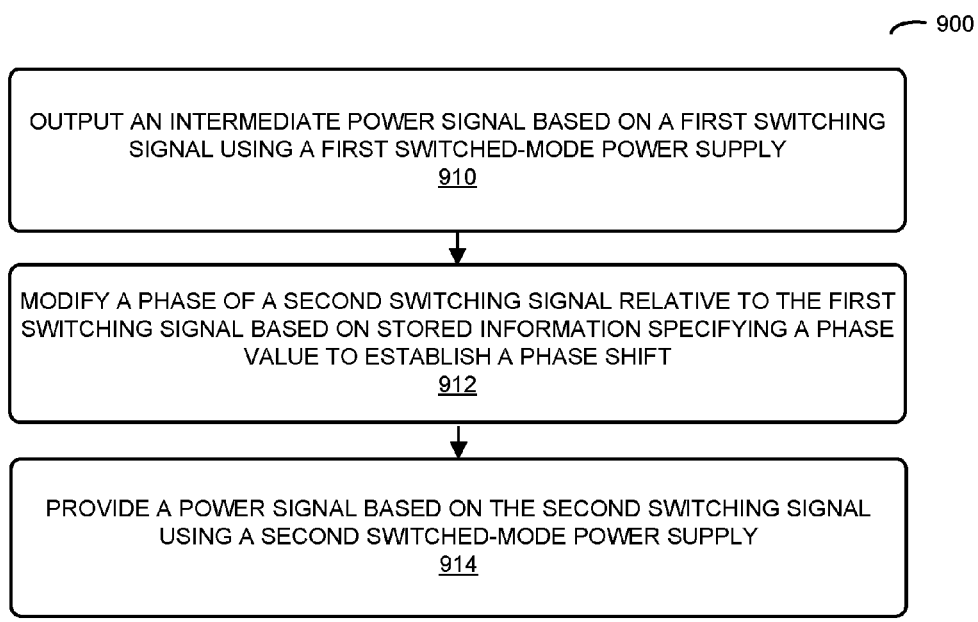
FIG. 9 presents a flowchart illustrating a method for providing a power signal in accordance with an embodiment of the present disclosure.

We now describe embodiments of a method. FIG. 9 presents a flowchart illustrating a method 900 for providing a power signal, which may be performed by a power supply (such as one of the power supplies in FIGS. 1 and 6-7). During operation, the power supply outputs an intermediate power signal based on a first switching signal using a first switched-mode power-supply circuit (operation 910). Then, the power supply modifies a phase of a second switching signal relative to the first switching signal based on stored information specifying a phase value to establish a phase shift (operation 912), corresponding to the phase value, between the first switching signal and the second switching signal, where the first switching signal and the second switching signal have a common fundamental frequency. Moreover, the power supply provides the power signal based on the second switching signal using a second switched-mode power-supply circuit (operation 914).

In some embodiments of method 900, there may be additional or fewer operations. Moreover, the order of the operations may be changed, and/or two or more operations may be combined into a single operation.

Referring back to FIG. 8, in general functions of power supplies 100 (FIG. 1), 600 (FIGS. 6), and 700 (FIG. 7) may be implemented in hardware and/or in software. Thus, electronic device 800 may include one or more program modules or sets of instructions stored in an optional memory subsystem 812 (such as DRAM or another type of volatile or non-volatile computer-readable memory), which may be executed by an optional processing subsystem 814. (In general, the synchronization technique may be implemented more in hardware and less in software, or less in hardware and more in software, as is known in the art.) Note that the one or more computer programs may constitute a computer-program mechanism. Furthermore, instructions in the various modules in optional memory subsystem 812 may be implemented in: a high-level procedural language, an object-oriented programming language, and/or in an assembly or machine language. Note that the programming language may be compiled or interpreted, e.g., configurable or configured, to be executed by the processing subsystem.

Components in power supplies 100 (FIG. 1), 600 (FIGS. 6), and 700 (FIG. 7), as well as electronic device 800 may be coupled by signal lines, links or buses. While electrical communication has been used as an illustrative example, in general these connections may include electrical, optical, or electro-optical communication of signals and/or data. Furthermore, in the preceding embodiments, some components are shown directly connected to one another, while others are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

Electronic device 800 may include one of a variety of devices that can include a power supply, including: a desktop computer, a server, a laptop computer, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Although we use specific components to describe power supplies 100 (FIG. 1), 600 (FIGS. 6), and 700 (FIG. 7), and electronic device 800, in alternative embodiments different components and/or subsystems may be used. For example, there may be jitter (such as ±10 kHz) between the switching signals for two stages in an embodiment of the power supply, as well as phase shift 124 (FIG. 1). Moreover, optional feedback mechanism 126 (FIG. 1) may be included in electronic device 800 as opposed to in power supply 100 (FIG. 1). Furthermore, storage mechanism 122 (FIG. 1) may include: a non-volatile memory, an array of resistors, a memory circuit and/or a fusible link. Additionally, one or more of the components may not be present in FIGS. 1-8. In some embodiments, power supplies 100 (FIG. 1), 600 (FIGS. 6), and 700 (FIG. 7), and electronic device 800 include one or more additional components that are not shown in FIGS. 1-8. For example, the power supply may be implemented in an integrated circuit. Also, although separate components are shown in FIGS. 1-8, in some embodiments some or all of a given component can be integrated into one or more of the other components and/or positions of components can be changed.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A power supply, comprising:
   a flyback converter configured to output a first power signal responsive to a first switching signal having a first frequency;
   a buck converter electrically coupled to the flyback converter and configured to output a second power signal responsive to a second switching signal having the first frequency;
   at least one switching controller configured to establish a phase shift between the first switching signal and the second switching signal based on a winding voltage of the flyback converter; and
   a feedback circuit coupled to the at least one switching controller and configured to monitor electromagnetic interference (EMI) associated with the power supply and to adjust the established phase shift responsive thereto.

2. The power supply of claim 1, wherein the at least one switching controller configured to establish a phase shift between the first switching signal and the second switching signal is a controller of the buck converter configured to establish the phase shift of the second switching signal relative to the first switching signal.

3. The power supply of claim 1, wherein the at least one switching controller configured to establish a phase shift between the first switching signal and the second switching signal is a controller of the flyback converter configured to establish the phase shift of the first switching signal relative to the second switching signal.

4. The power supply of claim 1, further comprising a second buck converter, electrically coupled to the flyback converter, configured to output a third power signal based on a third switching signal, wherein the third switching signal has the first frequency; and
   wherein the power supply is configured to establish a phase shift between the first switching signal and the third switching signal based on an additional specified phase value.

5. The power supply of claim 1, further comprising a second buck converter, electrically coupled to the buck converter, configured to output a third power signal based on a third switching signal, wherein the third switching signal has the first frequency;
   wherein the power supply is configured to establish a phase shift between the first switching signal and the third switching signal based on an additional specified phase value.

6. The power supply of claim 1, further comprising a programmable delay line, electrically coupled to a storage mechanism storing a specified phase value and to the buck converter, configured to establish the phase shift between the first switching signal and the second switching signal based on the specified phase value.

7. The power supply of claim 1, wherein the feedback circuit comprises an antenna and a receiver that monitor EMI associated with the power supply in one or more frequency bands.

8. The power supply of claim 1, wherein the feedback circuit implements a phase value optimization technique that selects a phase shift corresponding to minimum EMI.

9. An electronic device, comprising a power supply, wherein the power supply includes:
   a first switched-mode power-supply circuit including a first transformer and a first switching controller, wherein the first switched-mode power-supply circuit is configured to output a first power signal based on a first switching signal having a first frequency from the first switching controller; and
   a second switched-mode power-supply circuit including a second switching controller, wherein the second switched-mode power-supply circuit is electrically coupled to the first switched-mode power-supply circuit and configured to output a second power signal based on a second switching signal having the first frequency from the second switching controller, wherein at least one of the first and the second switching controller is configured to establish a phase shift between the first switching signal and the second switching signal based on a specified phase value and the monitored output voltage of the winding;
   the electronic device further comprising a feedback mechanism configured to monitor electromagnetic interference (EMI) associated with the power supply and to adjust the specified phase value based on an EMI criterion.

10. The electronic device of claim 9, wherein the second switching controller is configured to establish the phase shift of the second switching signal relative to the first switching signal.

11. The electronic device of claim 9, wherein the first switching controller is configured to establish the phase shift of the first switching signal relative to the second switching signal.

12. The electronic device of claim 9, wherein the specified phase value is stored in a storage mechanism which includes a programmable register.

13. The electronic device of claim 12, wherein the feedback mechanism is coupled to the programmable register.

14. The electronic device of claim 9, further comprising a third switched-mode power-supply circuit, electrically coupled to the first switched-mode power-supply circuit, configured to output a third power signal based on a third switching signal, wherein the third switching signal has the first frequency;
   wherein the power supply is configured to establish another phase shift, corresponding to an additional phase value, between the first switching signal and the third switching signal based on the additional phase value.

15. The electronic device of claim 9, further comprising a third switched-mode power-supply circuit, electrically coupled to the second switched-mode power-supply circuit, configured to output a third power signal based on a third switching signal, wherein the third switching signal has the first frequency;
   wherein the power supply is configured to establish another phase shift, corresponding to an additional phase value, between the first switching signal and the third switching signal based on the additional phase value.

16. The electronic device of claim 9, further comprising a programmable delay line, electrically coupled to a storage mechanism storing the specified phase value and the second switched-mode power-supply circuit, configured to establish the phase shift between the first switching signal and the second switching signal based on the specified phase value.

17. The electronic device of claim 9, wherein the first switched-mode power-supply circuit includes a flyback converter; and
   wherein the second switched-mode power-supply circuit includes a buck converter.

18. A method for providing a power signal, comprising:
outputting a first power signal based on a first switching signal having a first frequency received from a first switching controller using a first switched-mode power-supply circuit, the first switched mode power supply circuit including the first switching controller and a transformer;
monitoring an output voltage of a winding of the transformer with a second switching controller in a second switched-mode power-supply circuit;
modifying a phase of a second switching signal, having the first frequency, relative to the first switching signal based on the monitored output voltage of the winding and a specified phase value to establish a phase shift, corresponding to the phase value, between the first switching signal and the second switching signal received from the second switching controller;
monitoring electromagnetic interference (EMI) associated with the power supply and adjusting the specified phase value based on an EMI criterion; and
outputting a second power signal based on the second switching signal from the second switching controller using the second switched-mode power-supply circuit.

* * * * *